Jan. 19, 1954     H. SINCLAIR     2,666,876
ELECTRIC MOTOR DRIVE FOR DIFFERENTIAL GEARING
Filed Feb. 24, 1950     3 Sheets-Sheet 1
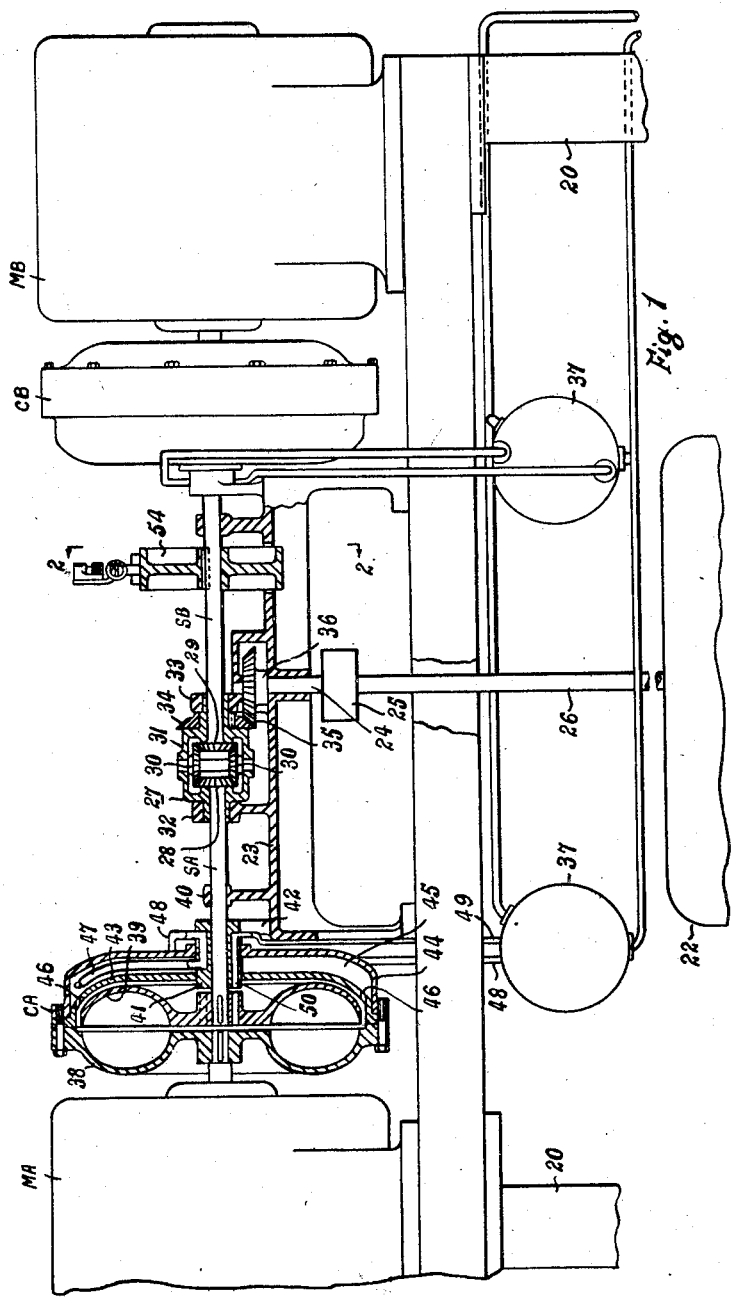
INVENTOR
*Harold Sinclair*
BY
*Dean Fairbank & Hirsch*
ATTORNEYS

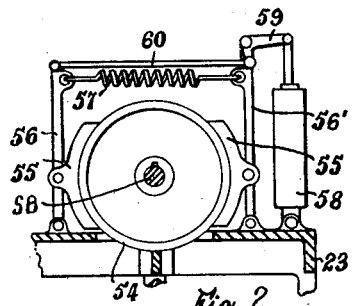
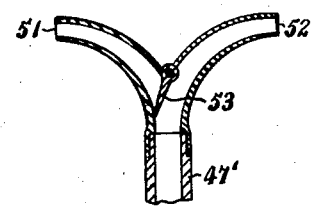
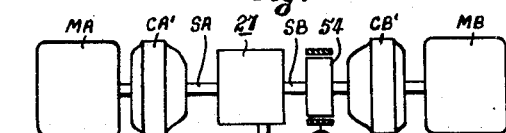
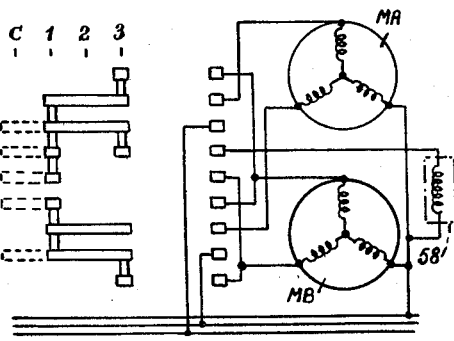
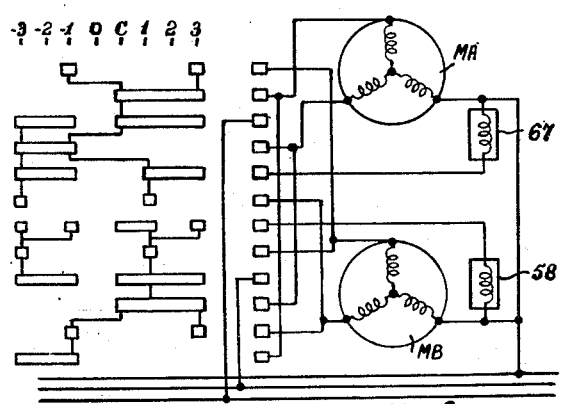

Patented Jan. 19, 1954

2,666,876

UNITED STATES PATENT OFFICE 2,666,876

ELECTRIC MOTOR DRIVE FOR DIFFERENTIAL GEARING

Harold Sinclair, London, England

Application February 24, 1950, Serial No. 145,978

Claims priority, application Great Britain
March 1, 1949

5 Claims. (Cl. 318—8)

This invention relates to electric motor installations of electrically driven machines of the kind which is required to operate at either a high speed or a relatively low speed at will and which has any one or any combination of two or more of the following characteristics, that is to say: (1) it is liable to become stalled by the load, (2) it is subject to an external force, such as gravity, wind or tide, and consequently capable of overrunning or running backwards when the driving or braking power ceases, (3) it has substantial inertia.

For example, such a machine having the above-mentioned characteristics (1) and (2) is a ship's anchor winch, which may operate under stalled conditions while freeing the anchor from the sea-bed when the ship is in still water, which is also subject to external forces when the anchor is being freed and the ship is influenced by waves, wind or tide, and which is subject to gravity while the anchor is being raised. An example of a machine having the characteristic (3) is a centrifugal separator, which is required normally to run at a high speed and at other times to sustain a low working speed with stability of speed, irrespective of substantial changes in the load, for example under "ploughing" conditions.

It is often considered essential to provide machines of the kind referred to, especially hoisting mechanism, with a direct-current supply so as to employ a D. C. motor, owing to the convenience, as compared with an alternating-current motor, with which a D. C. motor can be arranged to operate over a wide speed range. For the more exacting cases where slow speed and stability of speed control are required irrespective of load variations, the Ward-Leonard or an equivalent system of variable voltage regulation is frequently employed.

If a multi-speed squirrel-cage induction motor of the pole-changing type is used for loads having a high inertia and especially for lifting or hauling mechanism, speed changes are harsh, and, since in such mechanisms the speed range required is usually wide, these shocks cannot be effectively cushioned by the provision of a hydraulic turbo-coupling between the motor and the speed-reduction gearing of the mechanism, because on the one hand a coupling designed to be effective at the minimum speed would have too high a torque transmission capacity at the maximum speed, and on the other hand a coupling effective at the maximum speed would have insufficient torque capacity at the minimum speed, and would stall under load or be subject to excessive slip.

If a change-speed gear is used in a machine of the kind referred to, being situated between the motor and the load, it is a disadvantage that the stalling torque is undesirably increased during working in a low-speed gear. This is not greatly alleviated by introducing a hydraulic turbo-coupling between the motor and the change-speed gear.

An object of this invention is to provide an improved electric motor installation capable of operating on alternating current and wherein the difference between the full-load torque and the stalling torque does not vary widely as the result of changing of the speed ratios as in change-speed systems of the aforementioned types. In other words, an object is to provide a driving system wherein a high velocity ratio is obtainable for driving a load at low speed, whilst retaining the advantage of having a stalling torque ratio that does not vary widely as between the high- and the low-speed conditions, this being specially important in machinery which is required to operate at times at a relatively low creeping speed and which therefore with conventional gear systems might be liable to dangerously high stresses on stalling.

A further object is to provide favourable conditions of the driving motor as regards the rates of heating and self-cooling at times when the creeping speed is in action under high torque, and even when the load is stalled.

Other objects are to secure a stable speed/torque characteristic on both high and low speeds and when both driving and overrunning.

Another object is to enable a substantial proportion of the energy represented by braking to be regenerated to the A. C. supply, so that the over-all consumption of energy and the wear and tear of mechanical brakes are both reduced.

It has been proposed in British Patent No. 399,223 to provide an electric motor installation having two similar constant-speed electric motors driving through coaxial shafts pinions of different sizes of a differential mechanical gear which transmits motion to a driven member, the arrangement being such that, firstly, when the motors run in opposite directions, the driven member is rotated at a low speed, secondly, when one of the motors is de-energised and braked and the other continues to run, the driven member is rotated at an intermediate speed, and thirdly, when the motors run in the same direction, the driven member is rotated at a high speed. It has further been proposed in British Patent No. 427,868 to modify the arrangement described in British Patent No. 399,223, by using squirrel-cage motors one of which has a single constant speed and the other of which has windings arranged to give two constant speeds at will, the object being to obtain a choice of five different speeds of the driven member by keeping the constant-speed motor running and operating the two-speed motor in the following conditions:

| Motor Speed | Speed of driven member |
|---|---|
| High backwards | 1 (lowest). |
| Low backwards | 2. |
| De-energised and braked | 3. |
| Low forwards | 4. |
| High forwards | 5 (highest). |

These proposals have not been adapted on a commercial scale. The mechanisms described in the said patents would not operate satisfactorily, since the motors would fail to yield appropriate outputs when in parallel. The peaked torque-slip characteristics of ordinarily available squirrel-cage motors of normal type are such that, when the condition was changed from the intermediate speed with only one motor running to a higher speed with both motors running, in practice one of the motors would be forced to operate on the wrong side of the peak of its characteristic curve so that it ran at an abnormally high slip with excessive stator current, while the other motor ran near the full-speed condition with normal ampere load. This situation holds good with most squirrel-cage motors of the high torque type which also have a somewhat peaked characteristic to the torque/speed curve.

According to this invention an electric motor installation includes a differential mechanical gear having two input elements (hereinafter termed respectively input element A and input element B) and an output element, means for coupling the output element to the load, an alternating-current motor (hereinafter termed motor A) of a type having a synchronous speed (i. e. an induction motor or a synchronous motor), a driving connection between the motor A and the input element A, an alternating-current induction motor (hereinafter termed motor B), a driving connection between the motor B and the input element B, at least the motor B having at least two normal running conditions (i. e. equal synchronous speeds in opposite directions of rotation or two different synchronous speeds in the same direction of rotation), and a hydraulic turbo-coupling included in one of said driving connections. This coupling is preferably connected between the motor A and the input element A. Alternatively a second hydraulic turbo-coupling may be included in the other of said driving connections. The installation may be provided with common control means for said motors and operable to select various combinations of operating conditions of said input elements.

With this arrangement the characteristic of the hydraulic coupling can be adjusted in known manner, e. g. by selecting an appropriate quantity of working liquid, so that when the condition is changed either from a low speed, with the motors A and B running in opposition, or from the intermediate speed, with only the motor A running, to a high speed with both motors running in like sense, a slip is imposed on the hydraulic coupling sufficient to enable both motors to run on the rising part of their characteristic curves relating increase in torque to decrease in speed (i. e. increase in motor slip).

One or both of the motors may be of a type capable of generating a high starting torque and may be without manual control of rotor resistance. A suitable high starting torque may be, for example, a torque of 1½ to 2 times the normal full-load torque. One type of motor having such a high starting torque is a motor of the conventional high-torque squirrel-cage type, e. g. one having a double-wound rotor. Another type of motor having a suitable high starting torque is a slip-ring motor in which the rotor resistance is controlled by automatic means including a relay arranged to cut out rotor resistance automatically as the motor accelerates.

Where the motor B is connected to the input element B either directly, or through a hydraulic turbo-coupling of the constant-filling type, and where the installation is required to drive a load of high inertia, it is necessary for the motor B to be of such a size, in relation to the motor A, that it is capable of accelerating under the maximum torque that can be applied to it by reaction of the differential gear to torque delivered by the motor A, for a reason which will be hereinafter explained.

In most applications of the improved installation it is desirable or necessary to provide controllable braking means for the input element B. In apparatus according to the invention, when the output element is capable of running on, e. g. under the influence of gravity, and when the load is not provided with an independent brake, as it is in a hoist or a winding engine, additional braking means, also controllable by the common controller, may be provided acting preferably on the load. This controller may provide a condition in which the braking means for the input element B are released, the braking means for the load are applied, and one of the said motors is energised while the other motor is thereby rotated idly, so that the motors are cooled.

In a conventional system using an induction motor with means to control the speed, it is disadvantageous and at times dangerous on a winding engine, hoist, winch or crane application to move the speed control lever to one of the lower speed positions with the object of reducing speed when controlling a negative load (e. g. one overrunning due to gravity), since the effect is the opposite of what is intended, and the speed increases. In the system according to this invention this disadvantage does not arise, and the effect of moving the control lever to a lower-speed position is to reduce the speed of the load irrespective of whether it is positive or negative.

Embodiments of the invention will be described by way of example, some with reference to the accompanying diagrammatic drawings, in which:

Figure 1 shows, partly in section, a centrifugal separator having driving mechanism in accordance with the invention.

Figure 2 is a section of a detail on the line 2—2 in Figure 1.

Figure 3 is a section of another detail of the same mechanism.

Figure 4 is a circuit diagram of a controller for the mechanism shown in Figures 1 to 3.

Figure 5 is a diagram of a driving mechanism in accordance with the invention, and suitable for a winch or a crane.

Figure 6 is a circuit diagram of a controller for the mechanism shown in Figure 5.

Figure 7:
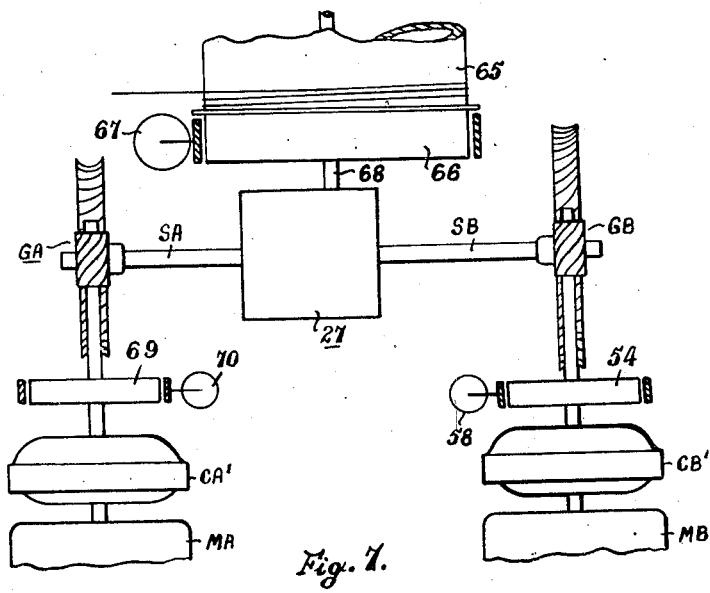
Figure 7 is a diagram of another form of winch mechanism in accordance with the invention.

The driving mechanism shown in Figure 1 is carried on a staging consisting of columns 20 and beams 21. A centrifugal separator basket 22 is suspended from a frame 23 by a shaft 24, a universal joint 25 and a shaft 26, in the usual manner. A differential gear, which is denoted as a whole by 27, and of which shaft 24 forms the output element, has two co-axial input members constituted by shafts SA and SB provided respectively with two bevel pinions 28 and 29 meshing with two bevel planet wheels 30 in a planet cage 31. The planet cage is rotatable in fixed bearings 32 and 33 and drivably connected by bevel wheels 34 and 35 to the shaft 24. The wheel 34 forms the output element of the differential gear. The wheel 35 is fast on the shaft 24 and has a hub 36 which co-operates with the frame 23 to form a thrust bearing carrying the weight of the basket 22. The differential gear in this example is symmetrically arranged so that, if the planet cage 31 is held fast, the input shafts SA and SB are constrained to rotate at equal speeds in opposite directions. Two squirrel-cage motors MA and MB are coupled respectively to the two input shafts. Motor MA is coupled through a hydraulic turbo-coupling CA to its associated input shaft SA. The turbo-coupling CA is of the scoop-tube type provided with an oil cooler 37. The coupling has an impeller 38 fixed to the shaft of the motor MA and a runner 39 fixed to the shaft SA which is supported in a bearing 40 on the frame 23. A sleeve 41 is supported by a bracket 42 and surrounds the shaft SA in a fluid-tight manner. A dished shell 43 is fixed to the impeller 38 and surrounds the back of the runner. A casing shell 44 also fixed to the impeller co-operates with the shell 43 to form a scoop chamber 45. Restricted drain ports 46 lead from the periphery of the working circuit contained by the impeller 38 and the shell 43 to the scoop chamber 45. The sleeve 41 passes through a central aperture in the shell 43 and in a fluid-tight manner through a central aperture in the shell 44 and carries a scoop tube 47 which communicates with a delivery pipe 48 leading to the cooler 37. A return pipe 49 leading from the cooler communicates with a port 50 in the sleeve opening into the working chamber of the coupling. When the impeller is rotating, the scoop maintains a continuous circulation of liquid through the cooler and back to the coupling, the liquid content of the coupling being substantially constant.

The shaft SB is fitted with a powerful electro-magnetically-operated friction brake biased towards its engaged condition and adapted to be disengaged in consequence of its being electrically energised. This brake has a drum 54 keyed to the shaft SB and co-operating with a pair of brake shoes 55 carried by levers 56 and 56' which are pivotally mounted on the frame 23 and urged towards each other by a tension spring 57. An electromagnetic actuator 58 designed to contract when energised is coupled as a link between the frame 23 and one arm of a bell-crank lever 59 pivoted to the lever 56'. The other arm of the lever 59 is connected by a pivoted strut 60 to the lever 56.

Motor MB, which is reversible, is coupled to the input shaft SB by a hydraulic turbo-coupling identical with the coupling CA with the exception that, since it is required to run in both directions, its scoop tube 47' (Figure 3) has two oppositely facing mouths 51 and 52 controlled by an automatic two-way flap valve 53 which prevents liquid scooped by either mouth from escaping freely through the other.

The motor MB is capable of exerting during its acceleration a torque exceeding the maximum torque that can be delivered by the motor MA, the excess of torque being not less than the friction torque in the differential gearing. Motor A runs at 1000 R. P. M. (synchronous speed) and is non-reversing. Motor B runs at 750 R. P. M. (synchronous speed) and, as already mentioned, is reversible.

A drum controller common to the motors and the brake is shown by a conventional circuit diagram in Figure 4, from which it will be apparent that the drum is operable to establish the working conditions set out in Table I when running unloaded at synchronous speeds:

*Table I*

| Condition | Speed of MA | Speed of MB | Speed of wheel 34 |
|---|---|---|---|
| Stop: | | | |
| O | 0 | 0 | 0 |
| C | +750 idling | −750 | 0 |
| 1st speed | +1,000 | −750 | +125 |
| 2nd speed | +1,000 | 0 | +500 |
| 3rd speed | +1,000 | +750 | +875 |

During acceleration of the load or under ploughing conditions on first speed, the input from the line is low since motor MB is regenerating. During retardation of the load, appreciable energy will be returned to the line upon changing down to second speed. When the change from second to first speed is made, the power generated by motor MA is nearly sufficient to supply the power taken by motor MB; hence the input from the line is low. Shock loading due to the application of the brake or the switching-on of motor MB is cushioned by the turbo-coupling CA. Under this system of driving, the turbo-couplings CA and CB are operating at normal speeds wherein the torque/speed characteristics are selected to be capable of good cushioning effect yet with a low slip at normal load.

The "stop" condition C in Table I is one in which only motor MB is energised and the brake is held off, so that motor MA is idled round at the same speed as motor MB but in the reverse direction, the output shaft being stopped. This enables both motors to be cooled during any interval in the working of the centrifugal machine.

The reason why the motor MB should be capable of accelerating under a torque exceeding the maximum torque that can be delivered by the motor MA when the turbo-coupling CB is of the constant-filling type is that it is necessary to ensure that, when motor MB is switched on to accelerate the load from the second-speed to the third-speed condition, the torque developed at the input shaft SB shall be high enough to exceed the maximum torque that can arise at this input shaft owing to the reaction through the differential gear of the torque due to the motor MA and the coupling CA under the condition of increased slip that is imposed on the motor MA and coupling CA in consequence of the acceleration of the input shaft SB resulting from the switching-on of the motor MB.

The example shown in Figure 1 may be modified by substituting for the scoop-tube couplings CA and CB hydraulic turbo-couplings of the selfcontained traction type, as described for example in Patent No. 2,301,645. Alternatively this example may be simplified by omitting the coupling CB and connecting the motor MB directly to the input shaft SB. In this case also it is clearly essential that the torque of the motor MB in its acceleration range shall exceed the maximum torque of the motor MA.

In a further modification of the example shown in Figure 1, the turbo-coupling CA, for example, may be of the glandless scoop-control type, as described in Patent No. 2,187,667 with reference to Figures 1 and 2 thereof, and which is provided with control means operable while the coupling is running for varying the liquid content of the working chamber and in consequence the slip characteristic. This enables the ploughing speed of the centrifugal separator to be varied as required by adjusting the slip in this coupling. Owing to the differential driving system, only a small increase in the slip in the coupling is required to decrease the speed of the centrifugal basket to the required value, say 5% of its maximum speed. In this case the coupling CB may be replaced by a hydraulic turbo-coupling of the traction type.

The electric motor installation shown in Figure 5, and which is suitable for a winch or crane, has its induction motors MA and MB connected respectively to the input shafts SA and SB by turbo-couplings CA' and CB' of the traction type. The shaft SB is provided with a brake arranged as described with reference to Figure 2 and having the actuator 58. The differential gear 27 has its cage connected by the 1-to-1 bevel gear to an output shaft 61 connected by reduction gearing 62, 63 to a drum shaft 64 to which is fixed a rope drum 65 and a brake drum 66. This brake drum co-operates with braking means like those described with reference to Figure 2 and capable of being disengaged by an electromagnetic actuator 67.

Figure 6 is a circuit diagram of a drum controller for the mechanism shown in Figure 5, and it is arranged to give, at synchronous speed, unloaded, the working conditions set out in Table II.

*Table II*

| Condition | Speed of MA | Speed of MB | Speed of shaft 61 |
|---|---|---|---|
| Lift: | | | |
| 3 fast | +1,000 | +750 | +875 |
| 2 medium | +1,000 | 0 | +500 |
| 1 slow | +1,000 | −750 | +125 |
| Cool C | +1,000 | −1,000 | 0 |
| Stop O | 0 | 0 | 0 |
| Lower: | | | |
| 1 slow | −1,000 | +750 | −125 |
| 2 medium | −1,000 | 0 | −500 |
| 3 fast | −1,000 | −750 | −875 |

The service speeds under load will be slightly lower when lifting and slightly higher when lowering owing to the motor slip and coupling slip when loaded.

If the cooling condition C is not required, the brake 66, 67 may be replaced by a similarly controlled brake on the input shaft SA.

In a further modification, as applied for example to a winch, motor A runs at 1000 R. P. M. and motor B is of the 2-speed type running at 1000 and 1500 R. P. M. The controller can be arranged to provide, in addition to the stop condition, the working speeds set out in Table III.

*Table III*

| Condition | Motor A | Motor B | Output at zero load |
|---|---|---|---|
| Creep lowering (by gravity) | −1,000 | +1,000 | 0 |
| Hoist or lower: | | | |
| 1st speed | −1,000 | +1,500 | +250 |
| 2nd speed | 0 | +1,500 | +750 |
| 3rd speed | +1,000 | +1,500 | +1,250 |

Under the creep lowering condition with maximum load, assuming 3% motor slip and 3% coupling slip, the actual output speed will be about 1/20 of full speed and very stable.

The last-described arrangement may be modified by adopting for B a 2-speed motor of 500 and 750 R. P. M., with the controller arranged to give the running speeds set out in Table IV.

*Table IV*

| Condition | Motor A | Motor B | Output at zero load |
|---|---|---|---|
| 1st speed | +1,000 | −750 | +125 |
| 2nd speed | +1,000 | −500 | +250 |
| 3rd speed | +1,000 | 0 | +500 |
| 4th speed | +1,000 | +500 | +750 |
| 5th speed | +1,000 | +750 | +875 |

In all the examples so far described the mechanical gearing is symmetrical and the two motors are capable of running at different speeds respectively. However it may be advantageous to use similar motors and hydraulic turbo-couplings with asymmetrical mechanical gearing. For example the motor installation shown in Figure 7 and suitable for a winch has two reversible motors MA and MB each having a synchronous speed of 1000 R. P. M. and driving respectively through hydraulic turbo-couplings CA' and CB' and worm reduction gears GA and GB the co-axial shafts SA and SB of a symmetrical differential gear 27. The reduction gears are similar except that the ratio of GA is say 4/1 and that of GB 5/1. The input shaft of the gear GB is provided with an electromagnetically-released brake 54, 58. The output shaft 68 of the differential gear is directly connected to the winch rope drum 65 and brake drum 66. An electromagnetically-released brake 69, 70 may be provided for the input shaft of the gear GA instead of or in addition to the drum brake 66, 67. The controller can be arranged to give at zero load the running speeds set out in Table V.

*Table V*

| Condition | MA | SA | MB | SB | Shaft 68 |
|---|---|---|---|---|---|
| Hoist or lower: | | | | | |
| 1st speed | +1,000 | +250 | −1,000 | −200 | +25 |
| 2nd speed | +1,000 | +250 | 0 | 0 | +125 |
| 3rd speed | +1,000 | +250 | +1,000 | +200 | +225 |

Another example of an asymmetrical mechanical gearing, as applied to a centrifugal separator, employs two squirrel-cage motors A and B respectively of 10 H. P. and 7½ H. P. continuous rating and having a synchronous speed of 1000 R. P. M. Motor A drives through a 12.75-in. turbo-coupling of the traction type and a worm reduction gear of 3½-to-1 ratio one input shaft of a differential gear. Motor B is reversible and drives through a similar coupling and a worm reduction gear of 4.67-to-1 ratio the other input shaft of the differential gear. This gear is of the symmetrical bevel type, the planet cage being connected to the output shaft by a speed-increasing bevel gear having a ratio of 1 to 4.125. A brake acting on the differential input shaft driven by motor B is of the spring-loaded electro-magnetically-released post type having a 15-in. drum. This arrangement gives a maximum speed of 950 R. P. M. of the output shaft at full load with motors A and B rotating in the same direction. When motor A rotates forwards and motor B is reversed, a ploughing speed of about 70 R. P. M. is provided.

It is thus apparent that a wide selection of speed ranges can be attained without the necessity for reversing either motor during any change between adjacent speeds.

In the foregoing examples, although the low speed achieved as the first speed step is only a small fraction of the maximum speed, nevertheless the turbo-coupling or turbo-couplings are rotating at a normal speed and hence with a small slip, and with normal torque limiting and cushioning values, which are particularly useful characteristics for the control of a descending load; the brake provided on the winch drum may be used as well to secure "inching" control, although this is not essential.

It will thus be apparent that the invention meets all practical requirements in the way of speed control, irrespective of whether the load is medium, heavy or light, and permits the driving mechanism to remain stalled on low speed indefinitely under load, without risk of damage, since even under such stalled conditions the motors and couplings are operating at suitably low values of slip.

The brake or brakes may be generously rated so as to be smooth in operation and powerful in action and thus to have only a brief slipping period; this reduces wear, and when the brake associated with motor B is applied, slip is imposed on the turbo-coupling associated with motor A which is loaded positively when the driven machine is being accelerated or is caused to regenerate when the machine is being retarded.

The control means may be arranged to operate in such a sequence that when accelerating the load a motor is switched on and the brake associated with it is released a moment later to allow for the short acceleration time of the motor, particularly when driving through an associated turbo-coupling. Conversely, when the load is to be retarded, the brake is applied and the motor is switched off a moment later to allow time for the brake to become effective before the motor torque ceases.

During switching onto first speed, a time delay may be provided in the control so that one of the motors is swtiched on a second or so before the other motor in order to obviate superimposing of the motor starting current peaks.

It will thus be apparent that the invention provides a practical solution of the problem of securing a degree of regenerative A. C. braking control of descending loads or loads having high inertia during retardation. It furthermore enables a wide range of speeds with convenient intervals to be provided by sturdy and efficient components, and without risk of excessive torque surges during speed changing or of instability on any speed irrespective of whether the load is positive or negative.

I claim:

1. An electric motor installation including a differential mechanical gearing having two input elements and an output element, and two alternating current electric motors coupled respectively to said input elements, at least one of said motors being an induction motor having a torque-speed characteristic which as the motor accelerates passes through a peak value and then falls to a lower value at the normal operating speed of the motor, wherein a hydraulic turbo-coupling is included in the driving connection between said induction motor and the input element to which said induction motor is coupled.

2. An electric motor installation according to claim 1, wherein said hydraulic turbo-coupling is provided with means operable while said coupling is running to alter its slip characteristic.

3. An electric motor installation according to claim 1, wherein said coupling is of the constant filling type and said induction motor is capable, with the aid of said coupling, of accelerating its associated input element under the maximum torque that can be applied to it from the other of said motors by reaction through the differential gearing.

4. An electric motor installation according to claim 1, including a first reduction gearing in the driving connection between one of said motors and its associated input element of the differential gearing, and a second reduction gearing in the driving connection between the other of said motors and its associated input element of the differential gearing, said reduction gearings being of different ratios.

5. An electric motor installation according to claim 1, wherein the other of said motors is an induction motor, including a hydraulic turbo-coupling in the driving connection between the other of said motors and its associated input element of the differential gearing.

HAROLD SINCLAIR.

References Cited in the file of this patent

UNITED STATES PATENTS

| Number | Name | Date |
|---|---|---|
| 436,127 | Edison | Sept. 9, 1890 |
| 854,721 | Day | May 28, 1907 |
| 855,623 | Emerson | June 4, 1907 |
| 1,235,132 | Gaylord et al. | July 31, 1917 |
| 1,945,233 | Roe | Jan. 30, 1934 |
| 2,133,365 | Trofimov | Oct. 18, 1938 |
| 2,346,877 | Trofimov | Apr. 18, 1944 |